United States Patent
Stieff et al.

(10) Patent No.: US 10,241,195 B1
(45) Date of Patent: Mar. 26, 2019

(54) METHOD FOR ASSESSING A CONDITION OF AN AXLE OF A MOVING VEHICLE

(71) Applicant: Hunter Engineering Company, St. Louis, MO (US)

(72) Inventors: Michael T. Stieff, Wentzville, MO (US); Timothy A. Strege, Sunset Hills, MO (US); Daniel R. Dorrance, Ballwin, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 16/029,345

(22) Filed: Jul. 6, 2018

Related U.S. Application Data

(62) Division of application No. 14/845,053, filed on Sep. 3, 2015.

(60) Provisional application No. 62/068,329, filed on Oct. 24, 2014, provisional application No. 62/046,506, filed on Sep. 5, 2014.

(51) Int. Cl.
*G01C 3/08* (2006.01)
*G01S 7/48* (2006.01)
*G01M 17/007* (2006.01)
*G01S 17/08* (2006.01)

(52) U.S. Cl.
CPC ......... *G01S 7/4808* (2013.01); *G01M 17/007* (2013.01); *G01S 17/08* (2013.01)

(58) Field of Classification Search
CPC ..... G01S 7/4808; G01S 17/08; G01M 17/007
See application file for complete search history.

(56) References Cited

U.S. PATENT DOCUMENTS

| | | | |
|---|---|---|---|
| 4,123,023 A | 10/1978 | Nelson | |
| 4,153,131 A | 5/1979 | Sakata et al. | |
| 4,341,021 A | 7/1982 | Beissbarth | |
| 4,745,469 A | 5/1988 | Waldecker et al. | |
| 4,863,266 A | 9/1989 | Masuko et al. | |
| 4,899,218 A | 2/1990 | Waldecker et al. | |
| 5,220,399 A | 6/1993 | Christian et al. | |
| 5,268,731 A | 12/1993 | Fuchiwaki et al. | |
| 5,532,816 A | 7/1996 | Spann et al. | |
| 5,600,435 A | 2/1997 | Bartko et al. | |

(Continued)

FOREIGN PATENT DOCUMENTS

| | | |
|---|---|---|
| JP | 63094103 | 4/1988 |
| JP | 11120480 | 4/1999 |

(Continued)

OTHER PUBLICATIONS

Sensing Solutions—Automotive Industry, pp. 1-12, 2005, Keyence Corporation, Product Lit. No. SS05S-AUTO-KA-L-E 0085-1, Japan.

(Continued)

*Primary Examiner* — Samantha K Abraham
(74) *Attorney, Agent, or Firm* — Sandberg Phoenix & von Gontard, P.C.

(57) ABSTRACT

A vehicle measurement station utilizing one or more displacement sensors disposed on each opposite side of an inspection region of a vehicle inspection lane to acquire displacement measurement data along associated measurement axes. At least a portion of the displacement measurement data is associated with the outermost wheel assemblies on an axle of a moving vehicle passing through the inspection region, and utilized to determine one or more vehicle characteristics, such as an axle total toe condition.

11 Claims, 7 Drawing Sheets

(56) References Cited

U.S. PATENT DOCUMENTS

| | | |
|---|---|---|
| 5,731,870 A | 3/1998 | Bartko et al. |
| 5,793,492 A | 8/1998 | Vanaki |
| 5,812,256 A | 9/1998 | Chapin et al. |
| 5,818,574 A | 10/1998 | Jones et al. |
| 5,978,077 A | 11/1999 | Koerner et al. |
| 6,151,562 A | 11/2000 | Merrill |
| 6,412,183 B1 | 7/2002 | Uno |
| 6,545,750 B2 | 4/2003 | Roth et al. |
| 6,559,936 B1 | 5/2003 | Colombo et al. |
| 6,657,711 B1 | 12/2003 | Kitagawa et al. |
| 6,748,796 B1 | 6/2004 | Van Den Bossche |
| 6,894,771 B1 | 5/2005 | Dorrance et al. |
| 7,177,740 B1 | 2/2007 | Guangjun et al. |
| 7,336,350 B2 | 2/2008 | Dorrance et al. |
| 7,454,841 B2 | 11/2008 | Burns, Jr. et al. |
| 7,774,946 B2 | 8/2010 | Boni et al. |
| 7,864,309 B2 | 1/2011 | De Sloovere et al. |
| 8,107,062 B2 | 1/2012 | De Sloovere et al. |
| 2003/0094039 A1 | 5/2003 | Poulbot |
| 2003/0142294 A1 | 7/2003 | Jackson et al. |
| 2006/0090356 A1 | 5/2006 | Stieff |
| 2006/0152711 A1 | 7/2006 | Dale, Jr. et al. |
| 2007/0044537 A1 | 3/2007 | Knox |
| 2007/0124949 A1 | 6/2007 | Burns, Jr. et al. |
| 2010/0180676 A1 | 7/2010 | Braghiroli et al. |
| 2013/0158777 A1 | 6/2013 | Brauer et al. |
| 2014/0129076 A1 | 5/2014 | Mouchet et al. |
| 2014/0253908 A1 | 9/2014 | Lee |
| 2014/0310967 A1 | 10/2014 | Nagornov |
| 2015/0059458 A1 | 3/2015 | Lee |
| 2015/0219785 A1 | 8/2015 | Tudor et al. |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, Ph.D, Wheel Alignment Goes 3-D, pp. 1-5, Nov. 5, 2010, Quality Digest Magazine, www.qualitydigest.com.

X-3Dprofile—Dürr Reinvents Wheel Geometry Measurement, pp. 1-2, 2007, Dürr Assembly Products, www.durr.com.

Optima Laser Distance Sensor, pp. 1-2, Mar. 2004, BS2 Multidata GmbH, www.bs-multidata.com.

SIDIS 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

Expert Solutions—Automotive Industry, pp. 1-4, 2009, Keyence Corporation, Product Lit. No. MeasureExpertAuto-KA-EN0630-E 1034-4, Japan.

METHOD FOR ASSESSING A CONDITION OF AN AXLE OF A MOVING VEHICLE

CROSS-REFERENCE TO RELATED APPLICATIONS

The present application is a divisional of co-pending U.S. patent application Ser. No. 14/845,053 filed on Sep. 3, 2015, which in turn is related to, and claims priority from U.S. Provisional Patent Application Ser. No. 62/046,506 filed on Sep. 5, 2014, and further claims priority from, U.S. Provisional Patent Application Ser. No. 62/068,329 filed on Oct. 24, 2014. Each of the aforementioned applications are herein incorporated by reference.

STATEMENT REGARDING FEDERALLY SPONSORED RESEARCH

Not Applicable.

BACKGROUND OF THE INVENTION

The present application is related to vehicle measurement or inspection systems, and in particular, to a vehicle inspection or measurement system configured to utilize one or more displacement sensors to acquire measurement data associated with various components of a vehicle axle as the vehicle moves past a stationary measuring station.

Systems for measuring vehicle properties, such as wheel alignment and associated parameters, are traditionally set up for obtaining measurements to a high degree of accuracy under controlled conditions, such as with the vehicle disposed in a stationary location on a level surface or alignment lift rack. These systems may require the temporary placement of various inclinometers or optical targets on the vehicle wheels, from which data is acquired to determine the various measurements. In general, vehicle wheel alignment measurement procedures require a technician to spend time preparing the vehicle for measurements, acquiring the measurements, and performing adjustments necessary to correct any identified problems. Often, a vehicle brought in to a shop for other services may unknowingly be in need of an alignment service as well. However, unless the service technician and the vehicle owner are willing to spend the time required to prepare the vehicle for measurement and proceed with an alignment measurement process, alignment issues will likely remain undetected and unrepaired.

In response to the recognized need for a way to quickly identify vehicles which may require an alignment service, various quick check or inspection systems have been introduced to the market, such as the Quick Check® System from Hunter Engineering Co. of St. Louis, Mo. These systems provide an operator with the tools and procedures necessary to quickly (in less than three minutes) obtain basic measurements of important vehicle wheel alignment angles, enter vehicle identifying information (such as through a VIN barcode scan), and review vehicle diagnostic information such as battery condition, tire tread depth, and on-board diagnostic messages. If a vehicle quick check or inspection reveals a potential out-of-specification measurement or problem, it can be quickly brought to the attention of the vehicle owner, who may then elect to proceed with a more in-depth vehicle service procedure, such as a full vehicle alignment service.

Often, vehicle quick check or inspection systems require a technician to carry out various tasks during the process, including attachment of optical targets or angle sensors to the wheels of the vehicle, manual measurement of tire tread depths, and the coupling of scanner component to vehicle data ports. In order for the technician to complete these tasks, the vehicle must be stationary for part of the time, such as for the attachment (and subsequent removal) of optical targets or angle sensors. This necessitates establishing a routine or procedure which must be followed by a technician each time a vehicle is brought into the shop for service. During busy times, or when multiple customers are waiting, a technician may not have sufficient time to carry out these routines or procedures for every vehicle, potentially failing to identify vehicles in need of additional services.

Vehicle wheel alignment systems have utilized a variety of techniques for non-contact measurement of vehicle wheel assembly parameters, from which vehicle alignment angles can be determined. For example, by utilizing multiple displacement measurement sensors, displacement measurements between known sensor locations and multiple locations on a stationary vehicle wheel assembly can be measured. Processing the acquired measurements from sensors observing stationary wheels on opposite sides of an axle can identify planes parallel to the wheel assembly surfaces, from which representations of total toe of an axle can be determined. In other configurations, two-dimensional images of a vehicle wheel assembly can be acquired, and image processing algorithms utilized to identify geometric features such as the wheel rim edge, from which a perspective analysis can be performed to determine estimates of the vehicle wheel assembly spatial position and orientation. Alternatively, structured light patterns, such as multiple laser lines, or colored stripes, can be projected onto the wheel assembly surface and observed by an imaging system. Deviations in the projected pattern are analyzed to generate representations of the illuminated surfaces, from which vehicle wheel assembly spatial position and orientation can be estimated. In general, these systems require the vehicle wheel assembly to remain stationary relative to the sensors during the measurement acquisition procedure, but some non-contact measurement systems require either the vehicle wheel assembly or the sensors be rotated about a stationary axis of rotation during the measurement acquisition procedure.

Some systems can acquire measurements as a vehicle wheel assembly is both rotated and translated past the sensors, such as during vehicle travel. For example, using laser displacement sensors to measure a distance between a fixed sensor and various points on vehicle wheel assemblies on opposite sides of a vehicle as the vehicle is driven at a slow speed between the sensors, enables a system to acquire measurement data along horizontal slices across each of the wheel assemblies, from which approximations of the individual wheel assembly spatial orientations can be derived. These types of systems are highly influenced by the speed at which the vehicle travels between the sensors, the angle (straightness) of vehicle travel relative to the sensor observation axis, and changes in steering of the vehicle as it passes between sensors. Measurements acquired from a moving vehicle are useful to provide a vehicle service quick check or audit inspection, capable of identifying vehicles which may be in need of a further, more precise, alignment inspection and/or adjustment.

Accordingly, there would be a benefit to the vehicle service quick check or inspection industry if an increased number of preliminary vehicle measurements could be acquired as the vehicle is driven, such as by a customer, through a field of view associated with a non-contact measurement station, preferably without the need to stop before or after passing the measurement station, to have a technician install or remove wheel-mounted optical targets or angle sensors.

There would be an additional benefit to the vehicle service quick check or inspection industry if the sensitivity of a non-contact measurement station to variations in vehicle speed, steering, and direction of travel could be accounted for or attenuated.

BRIEF SUMMARY OF THE INVENTION

Briefly stated, the present application sets forth a vehicle measurement station which utilizes one or more laser displacement sensors disposed on opposite sides of a sensor region to acquire measurement data, associated with a moving vehicle passing through the sensor region, by measuring distances between each sensor and an associated laser spot projected onto an observed surface of the vehicle.

In one embodiment, a laser spot is projected onto the surface of a moving vehicle from a stationary sensor at a sufficient height to traverse a substantial portion of each wheel assembly on an associated side of the vehicle as the vehicle moves through a sensor region. Measurement data representative of the distance between the sensor and two or more spaced apart points on each vehicle wheel assembly is acquired and utilized by a processing system to determine a horizontal angular measure associated with each vehicle wheel assembly at the height of the laser spot.

In a further embodiment, a pair of laser spots are projected onto the surfaces of a moving vehicle from stationary sensors at different heights, to traverse two vertically spaced portions of each wheel assembly on an associated side of the vehicle as the vehicle moves through the sensor region. Measurement data representative of the distances between the sensors and two or more vertically spaced points on each vehicle wheel assembly is acquired and utilized by a processing system to determine a vertical angular measure associated with each vehicle wheel assembly between the pair of laser spots.

In another embodiment, the present application sets forth a vehicle measurement station which utilizes at least one pair of non-contact imaging sensors disposed on opposite sides of a sensor region to acquire measurement data associated with a moving vehicle passing through the sensor region, and in particular, to acquire measurement data associated with vehicle wheel assemblies on opposite sides of an axle. Data acquired by each imaging sensors is processed to acquire two or more measures of distances between each sensor and an associated point of laser illumination projected onto a surface of an adjacent vehicle wheel assembly passing through an associated imaging sensor observable field of view. A processor is configured to evaluate the measurement data associated with wheel assemblies on each axle, together with the known parameters of the system, to determine an orientation measurement associated with each axle of the vehicle passing between the opposed non-contact imaging sensors.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
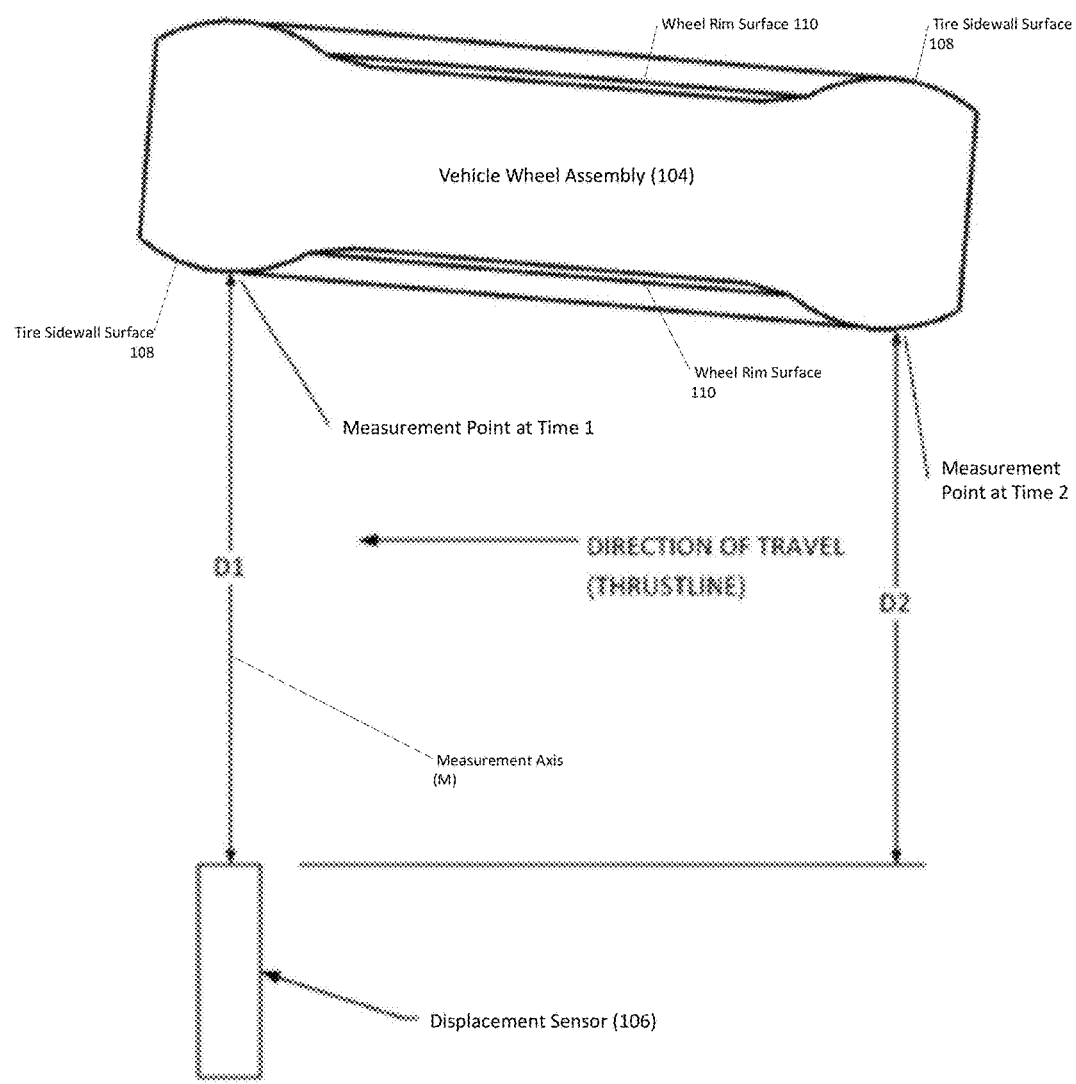
FIG. 1 is a top plan view of the relationship between a laser displacement sensor and a moving vehicle wheel assembly for measuring an angular orientation of the wheel assembly in the horizontal plane.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies disposed on opposite lateral sides of the vehicle which are generally axially aligned with each other, such as the front wheels or rear wheels. The pair of vehicle wheel assemblies may be, but are not limited to wheel assemblies coupled by a solid interconnecting axle shaft, by a pair of half-shafts coupled through a differential, may be partially independent of each other, or may be fully independent of each other.

Since the present application describes features which are present on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle. For example, a sensor unit described generically as (100) will be designated as (100R) and (100L) when shown or described at either the right or left side of the vehicle inspection lane.

Figure 4:
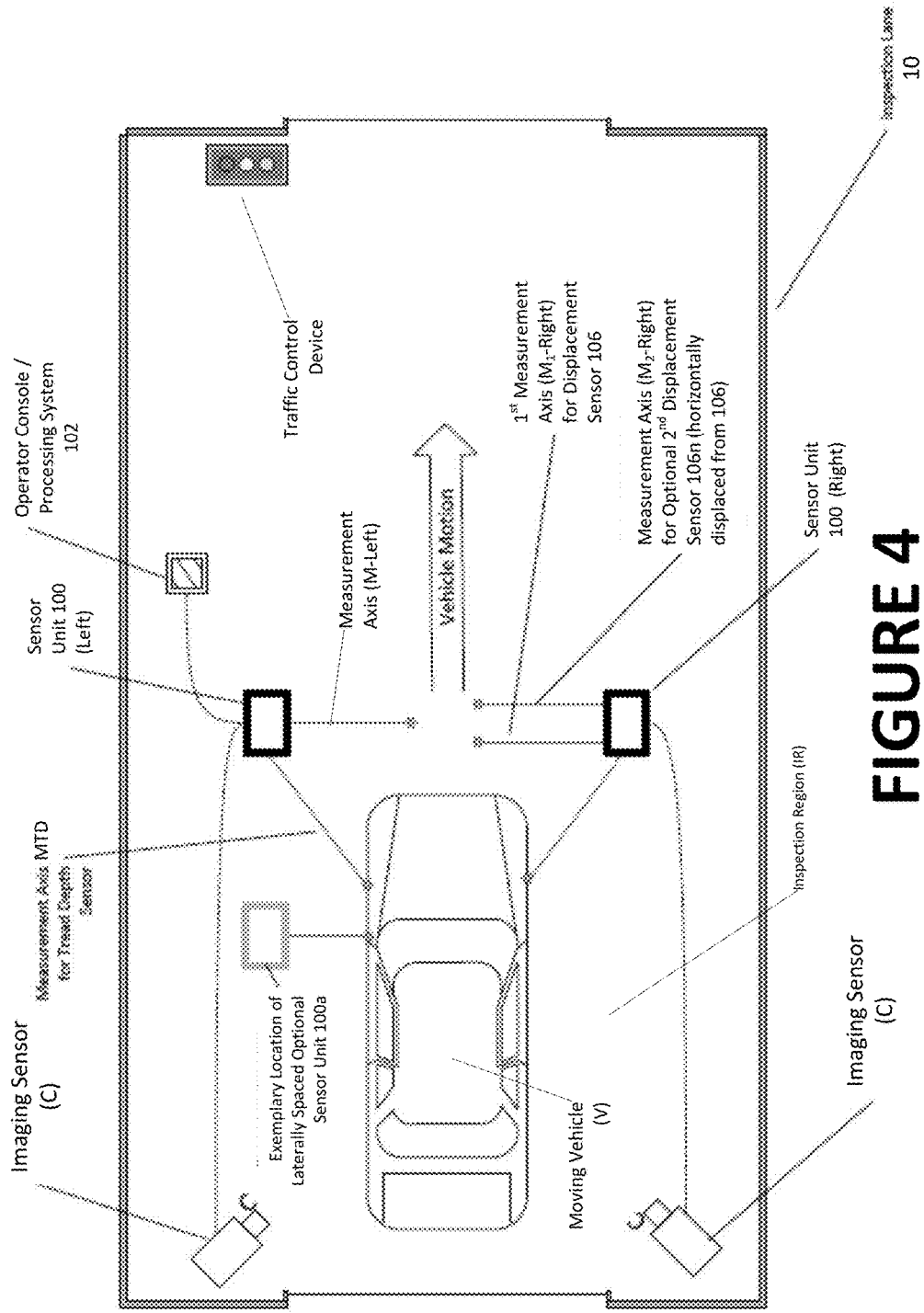
FIG. 4 is a top plan view of a drive-through vehicle inspection lane, illustrating exemplary configurations and placement locations for sensor units of the present disclosure.
Figure 5:
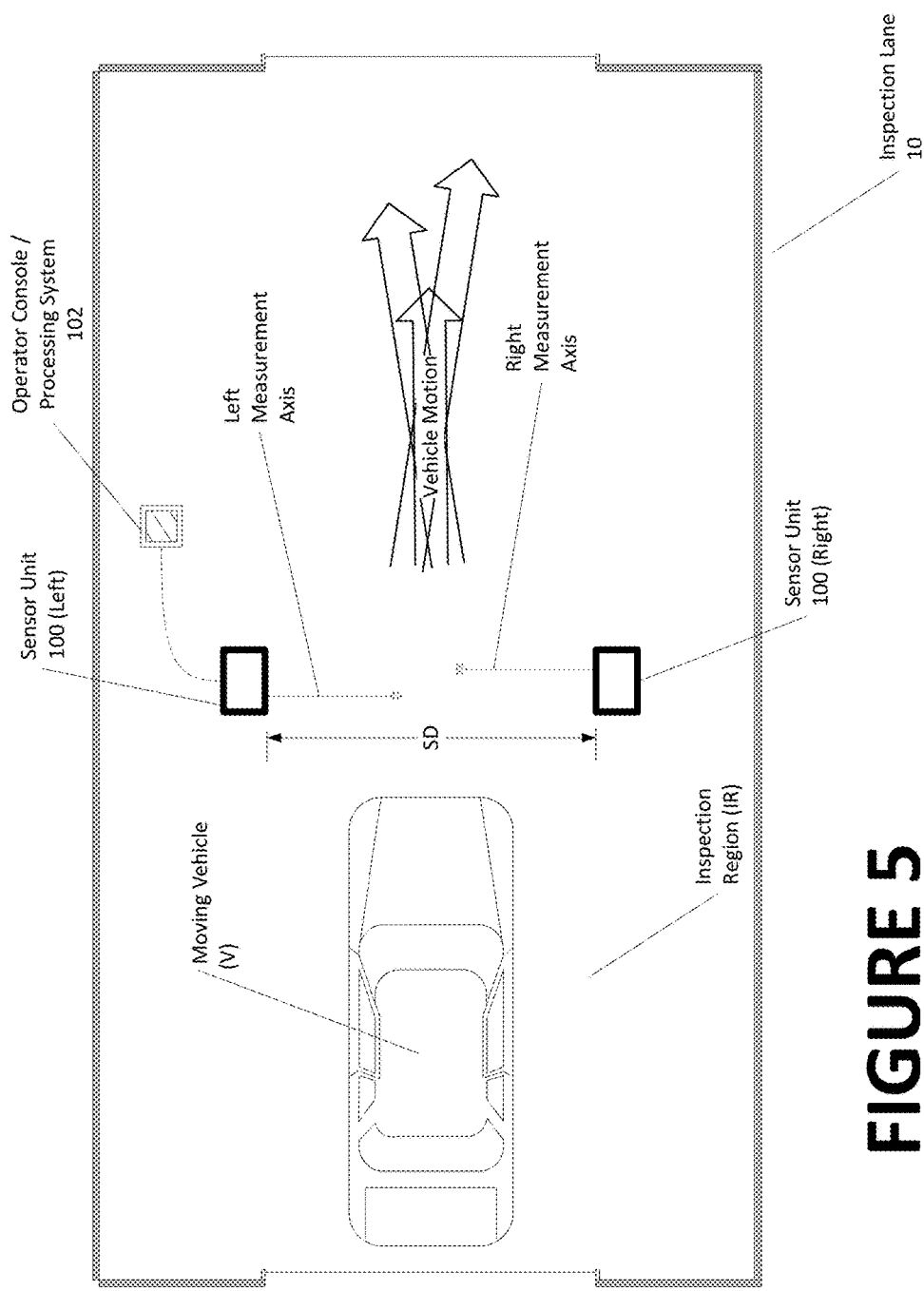
FIG. 5 is a top plan view of a simplified drive-through vehicle inspection lane, illustrating an exemplary configuration and placement locations for sensor units of the present disclosure.

A vehicle measurement system of the present disclosure is generally intended for use in a vehicle service shop drive-through configuration, where a moving vehicle V is driven in a generally straight line (but not necessarily along, or parallel to, a longitudinal midline) through an inspection region IR of a service or inspection lane 10 as seen in FIGS. 4 and 5. As the vehicle V passes through the inspection region IR, the vehicle V is observed by various sensors 100 acquiring measurement data, and optionally, cameras or imaging sensors C acquiring vehicle-associated still-frame or motion video images. Data from the various sensors 100, C is conveyed to a processing system 102 configured with suitable software instructions to control the various sensors, receive data therefrom, analyze the received data, receive operator input, and convey resulting measurements to an operator console output or report. The output or report may be a display on an operator console, a printed report, storage in a machine-readable database, or communication over a network to a remote vehicle service system or software application. The processing system 102 may be in the form of a dedicated computer system and operator interface associated with a specific set of sensors 100, C forming a vehicle measurement system, or may be in the form of a server system configured to handle multiple sets of sensors forming two or more vehicle measurement systems. Communications between the various sensors 100, C and the processing system 102 may be via any conventional data transmission means, such as wired networks, wireless networks, or any combination thereof.

It will be understood that while portions of this application describe a single sensor unit 100 within a vehicle measurement system having a field of view to sequentially observe at least the front and rear wheel assemblies 104 on one lateral side of a moving vehicle V traversing the sensor field of view, a second identical sensor unit 100 will be disposed with a field of view to sequentially observe the front and rear wheel assemblies 104 on the opposite lateral side of the moving vehicle V, and the resulting data from both sensor units 100R, 100L is received, evaluated, and presented to an operator in a meaningful manner at the console 102 or report as seen in either FIG. 4 or 5.

In an exemplary configuration for measuring a characteristic associated with an axle of the moving vehicle V, a sensor unit 100 consists of a support framework positioned and configured as necessary to mount one or more displacement sensors 106 such that an operative field of view for each displacement sensor 106 will encompass the observable surfaces of vehicle wheel assemblies 104 on both lateral sides of the moving vehicle V for a range of measurable vehicles traversing the observation region along a measurement axis M. It will be readily recognized that displacement sensors 106 have an operational range within which the displacement sensor is capable of measuring a distance to an observed surface within a desired tolerance, and that given the wide variation in vehicle configurations, each sensor unit 100 must be disposed such that the observed surfaces on an intended collection of vehicle configurations will pass through the associated observation region. Generally, this will necessitate that at least one sensor unit 100 be disposed on each lateral side of a drive-through inspection lane 10, with at least one displacement sensor 106 in each sensor unit 100 oriented to acquire measurements from undistorted portions of vehicle wheel assemblies 104 on moving vehicles V.

The sensor unit 100 may be in the form of a vertical tower positioned on a floor surface in proximity to the drive-through inspection region IR, a wall-mounted housing, a surface or flush-mount configuration, or a combination thereof for mounting a plurality of individual sensors 100. Preferably, but not required, the sensor units 100 on opposite sides of the vehicle service bay are located in approximate alignment, such that each sensor unit 100 observes substantially corresponding, but laterally opposite, portions of a moving vehicle V surface and/or wheel assembly 104 at generally the same time.

A variety of displacement sensors 106 may be utilized within the scope of the present disclosure to obtain distance measurements from a moving vehicle V passing through an inspection lane 10, including, but not limited to, 2D imaging sensors, time-of-flight optical sensors, ultrasonic sensors, LIDAR and laser displacement sensors. Exemplary laser displacement sensors 106 suitable for use in the sensor units 100 are the IL-Series CMOS multi-function analog laser displacement sensors from Keyence Co. of Osaka, Japan.

A laser displacement sensor 106 uses a triangulation measurement principle as follows: A semiconductor laser beam is projected along a measurement axis from the displacement sensor 106 and reflected off a target surface. The reflected beam passes through a receiver lens system in the displacement sensor, and is focused onto a light sensing pixel array such as a CCD or CMOS device. The light sensing array detects the peak value of the light quantity and the distribution of the beam spot. The distribution of the beam spot on the pixel array corresponds at least partially with the characteristics of the surface from which the laser beam is reflected. The pixels (individual light sensing elements) on the array within the area impinged by the reflected beam spot are used to determine the precise target position. As the target displacement changes relative to the displacement sensor 106, the reflected beam position changes on the light sensing array. These positional changes are analyzed by an associated controller or processor to provide associated displacement measurement values. The distribution of the beam spot, and any observed changes may be analyzed by the associated controller or processor to identify characteristics of the reflecting surface, such as material type, reflectivity, or transparency.

In one embodiment of the present disclosure, the displacement sensor 106 unit is a 2D displacement sensor, consisting of at least one laser beam projector disposed to project a laser beam along a measurement axis M onto the surfaces for which a displacement measurement is required. Optionally, multiple laser beam projectors may be disposed to project laser beams along a plurality of measurement axis $M_1$-$M_n$. Laser light reflected from the surface passes through a receiver system in the displacement sensor unit 106, and is focused onto a two-dimensional light sensing pixel array such as a CCD or CMOS device. The light sensing array detects the peak values of the light quantity, the locations of, and the distributions of, the reflected laser beam spot(s). The distribution of an individual laser beam spot on the pixel array corresponds at least partially with the characteristics of the surface from which the laser beam is reflected. The location of the pixels (individual light sensing elements) on the array within the area impinged by the reflected beam spot(s) are used to determine the associated target point position or displacement relative to the light sensing pixel array. As the displacement of the target surface changes relative to the light sensing pixel array of the sensor, the reflected beam positions change on the light sensing array. The sensitivity of the displacement sensor 106 to changes in the target displacement (i.e. movement) varies according to rate at which data is sampled from the light sensing pixel array. Preferably, the data sample rate is sufficient to enable measurements to be acquired from a vehicle V moving at speeds typically found in an automotive service shop drive-through inspection lane 10, i.e., less than 10 miles per hour.

These positional changes of the reflected beam(s) on the light sensing pixel array are analyzed by an associated controller or processor to provide associated displacement measurement values. The distribution of the reflected laser beam spot(s), and any observed changes may optionally be analyzed by the associated controller or processor to identify characteristics of the reflecting surface, such as material type, reflectivity, or transparency. If two or more lasers beam projectors are employed and the associated reflected laser beam spots observed, knowing the relationship of the measurement axis $M_1$-$M_n$ for the laser beams to each other, (i.e., a horizontal displacement, a vertical displacement, or both), relative to a common reference plane, such as the ground, provides additional information about the illuminated target surfaces, such as an angular orientation between the surfaces, or the motion of the surfaces.

Those of ordinary skill in the art will recognize that more than two semiconductor laser beam projectors may be utilized to project a plurality of parallel laser beams (for example, defining a grid of illuminated points on the surface of an observed object) which are subsequently reflected to the two-dimensional light sensing pixel array, providing additional information about the observed surface.

Figure 2:
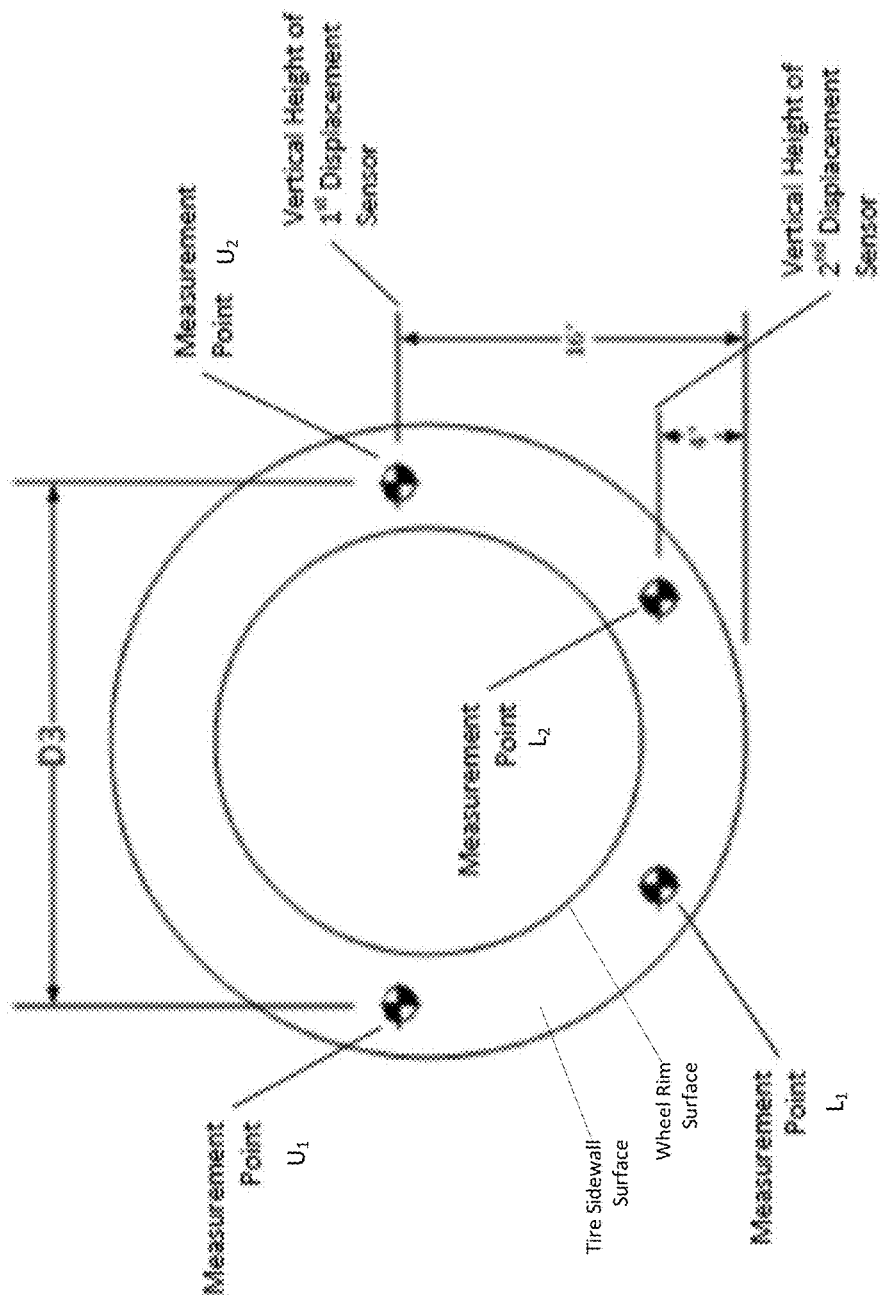
FIG. 2 is an illustration of exemplary measurement locations on a moving vehicle wheel assembly associated with a pair of vertically spaced displacement sensors for measuring angular orientations of the wheel assembly in both the horizontal and vertical planes.

In general, in one embodiment of the present disclosure, a laser displacement sensor 106 is utilized to measure distances between the receiver pixel array mounted within the displacement sensor 106 and each of the front and rear wheel assemblies 104 on one side (left or right) of a moving vehicle V passing through the inspection region IR of the inspection lane 10 as shown in FIGS. 1, 2, 4, and 5. As the vehicle passes through the sensor region of the inspection lane, each laser spot L projected from the laser displacement sensor traverses horizontally across the side of the vehicle presented towards the sensor unit, at a height which intersects at least a portion of each of the front and rear vehicle wheel assemblies 104, as seen in FIG. 2, producing a plurality of data points from which a contour plot of the vehicle surfaces can be established. Various fitting algorithms, such as curve fitting techniques can be utilized to smooth or match the contour plot to known vehicle features. For a vehicle which is moving in a straight line, with each wheel assembly 104 aligned parallel to the direction of travel (i.e., having zero toe), a projected laser spot L will intersect an identified circumferential feature of the wheel assembly 104 (such as the tire sidewall surface edge, rim guard feature, peak tire sidewall bulge, or wheel rim edge, at two points, each having the same measured displacement from the sensor (D1=D2). The various features can be identified by analysis of the points defining the contour plot, and are often demarked by clear or abrupt transitions, such as from a wheel well gap to a tire sidewall surface 108, from a tire sidewall surface 108 to a raised tire rim guard edge, and from a tire rim guard edge to a metallic wheel rim surface 110.

Vehicle wheels which are not aligned parallel to the straight-line direction of travel for the vehicle (i.e., having non-zero toe, such as shown in FIG. 1) will produce different measured displacements (D1≠D2) from the displacement sensor 106 for the two points at which the measurement axis M intersects the selected circumferential feature as the vehicle moves past the displacement sensor 106.

In one exemplary embodiment, geometric evaluation (arctan) of the difference in the displacement measurements (D1) and (D2), taking into account a horizontal spacing (D3) between the locations of the two points, shown in FIG. 2, on the wheel assembly 104 as shown in Equation (1), is representative of an individual toe angle measurement for the observed wheel assembly.

$$\text{TOE} = \arctan\frac{(D1 - D2)}{D3} \qquad \text{Eqn. (1)}$$

When combined with a corresponding toe angle measurement for a wheel assembly 104 on the opposite end of the same axle, a measure representative of total toe for that axle can be determined.

The horizontal spacing (D3) between the location of the two points on the wheel assembly 104 can be established by a variety of techniques, including image analysis of video images acquired by an imaging sensor positioned to acquire at least one image of the wheel assemblies 104, or geometric analysis based on a measured speed of travel for the moving vehicle V through the inspection region IR of the inspection lane 10. Vehicle speed can be measured using any of a variety of known techniques, including various triggers (optical, mechanical, or ultrasonic), image processing, or the use of differential timing between sequentially captured measurements of the same data point by separate displacement sensors 106 disposed in a known spatial configuration, such as seen in FIG. 4.

For example, one sensor unit 100 may be fitted with one or more optical interrupt sensors having optical beams extending across the travel path of a vehicle wheel assembly, at a level which is below that of the vehicle body panels. Output signals from the optical interrupt sensors may be utilized to determine a vertical centerline of a vehicle wheel assembly. As a wheel assembly 104 rolls through the inspection region IR, a leading edge of the tire sidewall surface 108 will interrupt the optical beam. Continued motion of the vehicle wheel assembly 104 will restore the optical beam once the trailing edge of the tire sidewall surface 108 passes. The duration during which the optical beam was interrupted is related to the speed at which the vehicle V moves through the inspection lane 10 and the horizontal width of the tire at the height of the optical beam. Identifying the mid-point in time between the interruption and the restoration of the optical beam establishes a point in time at which the vertical centerline of the tire passes the optical interrupt sensor, and enables correlation with measurements from the displacement sensors 106 if they are disposed in a known relationship to the optical interrupt sensor within the sensor unit 100.

In a further embodiment, a second displacement sensor 106a is mounted within the sensor unit 100 at a location vertically displaced relative to the first displacement sensor 106. As a vehicle V moves through the inspection region IR of the inspection lane 10, the first and second displacement sensors 106, 106a provide measurement data at different vertical locations along the vehicle surfaces. For example, as seen in FIG. 2, the first displacement sensor 106 may be disposed to acquire measurement data from measurement points $U_1$, $U_2$ at a height of approximately 16" above the surface of the inspection lane, while the second displacement sensor 106a is disposed to acquire measurement data from measurement points $L_1$, $L_2$ at a lower height of approximately 6" above the surface of the inspection lane.

Measurement data acquired by the second displacement sensor 106a, utilized in combination with measurement data acquired by the first displacement sensor 106, and with relative spatial position and orientation data for the individual displacement sensors, can be geometrically evaluated to provide a measure representative of a camber angle for the vehicle wheel assembly 104 by identifying one or more differences in the distances to the upper and lower portions of the vehicle wheel assembly 104. Similarly, distance measurements which are representative of the peak curvature or bulge of the tire sidewall surface 108 adjacent to the top of the wheel assembly 104 and adjacent the bottom of the wheel assembly 104 may be compared to provide an estimate of tire inflation pressure or indication of an under-inflation condition. Utilizing a curve-fitting algorithm, the measurement points identified as peak points on the observed tire sidewall surfaces can be estimated to lie on a common circle about the tire axial center point. Utilizing the estimated tire axial center point, the processing system 106 can make estimates as to dimensions of the wheel assembly dimensions 104.

Adding additional displacement sensors 106 to the sensor unit 100 (or in a separate sensor unit 100a disposed to observe the same side of the vehicle V in an inspection lane 10) provides further measurement information which may be used to evaluate the vehicle V passing through the inspection lane 10. In a first example, one or more additional displacement sensors 106n may be mounted within the sensor unit 100 in an adjacent and parallel arrangement, separated by a known (or determinable) horizontal spacing to provide for a second set of measurement data points along a common lateral line of vehicle V. By associating the measurement data stream from each horizontally spaced displacement sensor with a synchronized clock, identified features observed by the first displacement sensor 106 can detected in the measurement data of a second displacement sensor 106n and an elapsed time between the measurements established. Through further processing of the elapsed time between measurements, and the horizontal spacing between the displacement sensors 106, 106n, a representation of the speed at which the vehicle is passing the sensor unit 100 can be identified. Vehicle speed can be used to facilitate an estimate of spacing between the front and rear axles, enabling estimates of the vehicle centerline, thrust angle, and individual toe measurements to be made if sufficient measurement data is captured. Using a horizontally spaced second displacement sensor 106n (or set of displacement sensors) to obtain a second representation of toe and/or camber for an observed vehicle wheel assembly 104 enables an estimate of runout for the vehicle wheel assembly 104 to be determined, using a known or calculated angular rotation of the vehicle wheel assembly 104 between the two displacement measurements. Once determined, an estimate or representation of runout can be used in a traditional manner to compensate or correct other measurements associated with the vehicle wheel assembly 104.

In a second example, a one or more additional displacement sensors 106n may be mounted within the sensor unit in a horizontally spaced arrangement, such that a first displacement sensor 106 unit functions as an optical trigger for the second displacement sensor 106n upon detection of a moving vehicle V within the sensor region and field of view associated with a measurement axis M. Detection of a moving vehicle V, or other object within the sensor region and associated field of view of an optical trigger may be used by the processing system to provide an operator with a warning of the potential hazard (such as a moving vehicle V) through an auditory and/or visual signal.

Measurement data acquired by displacement sensors 106 is not limited to measurements associated with vehicle wheel alignment angles. As the vehicle V moves through the inspection region IR of the inspection lane 10, a displacement sensor 106 can acquire measurement data which is representative of the position of the fender surfaces on the leading and trailing portions of the wheel well surrounding each vehicle wheel assembly 104. By comparing the spatial position of the leading and trailing portions of the wheel well, and either assuming they both lie within the same vertical plane or having specific knowledge of the vehicle body configuration, the processing system 102 can generate an estimate of the direction of travel for the vehicle V through the inspection lane 10. The estimated direction of travel can be compared by the processing system 102 with a determined orientation of each vehicle wheel assembly 104 as it passed through the field of view of the same displacement sensor 106, thereby identifying a steering direction of the vehicle wheel assembly 104. The processing system 102 may further utilize an identified steering direction to compensate determined alignment angles for each observed vehicle wheel assembly 104.

Figure 3:
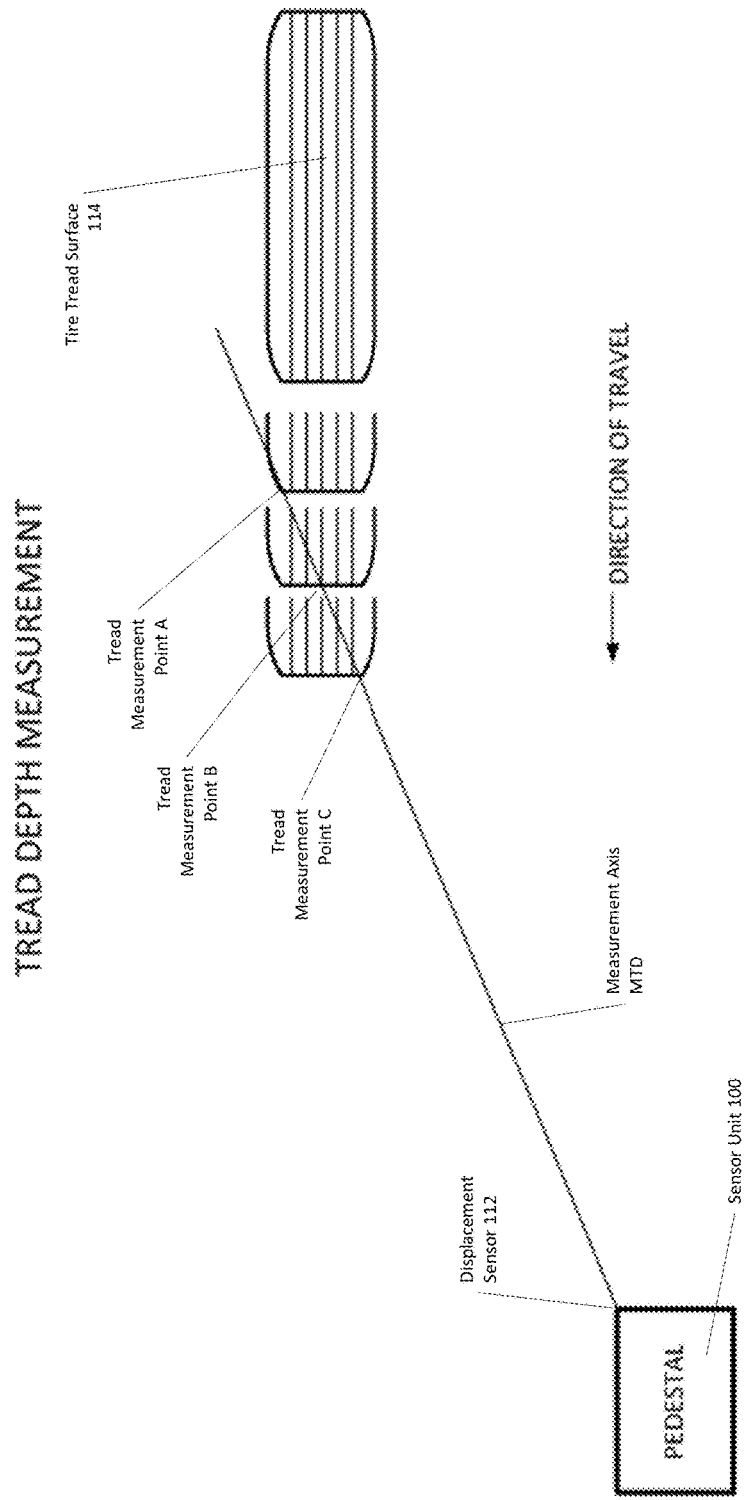
FIG. 3 is a top plan view of an optical axis for a displacement sensor to acquire tire tread depth measurement data associated with an approaching vehicle wheel assembly.

In a further embodiment, illustrated in FIG. 3, the sensor unit 100 may be configured with an additional displacement sensor 112 having a measurement axis MTD which is oriented towards an approaching vehicle at a height suitable for acquiring measurements representative of tire tread depth from a leading visible tire tread surface 114. The positioning height of the displacement sensor 112 above ground is selected such that the measurement axis MTD is not generally blocked by vehicle body components, air dams, or splash guards. It is preferable, but not required, that the measurement axis MTD intersect a portion of the tire tread surface 114 an angle which is greater than 45 degrees relative to vertical, so as to avoid attempting to measure the distorted portion of the tire tread surface 114 which is near the tire contact patch. As the vehicle V moves forward through the inspection lane 10, the tire tread surface 114 will move across the angled measurement axis MTD such that measurement data can be acquired from a multitude of tread measurement points A-n across the width of the tire tread surface 114 as seen in FIG. 3. Measurements of the vehicle speed can be used to compensate the tire tread depth measurement data for any distortions due to the approach of the vehicle towards the displacement sensor 112. Alternatively, those of ordinary skill in the art will recognize that the sensor measurement axis MTD may be oriented to acquire tire tread depth measurements from the trailing visible tire tread surface 114 as the vehicle V moves away from the sensor unit 100. Acquisition of measurement data from a tread depth displacement sensor 112 can be triggered either by the detection of an object within a suitable measurement range of the sensor unit 100, or upon receipt of a trigger signal from another sensor unit 100 disposed to observe the position of a vehicle V within the inspection lane 10.

In addition to utilizing displacement sensors 106 to obtain measurement data associated with a vehicle, suitably positioned displacement sensors 106 within a sensor unit 100 may be oriented to obtain measurement data which is related to the spatial position of the sensor unit 100 itself. For example, in a surface-mount sensor unit 100, at least one displacement sensor 106 may be oriented to measure a distance to the ground surface on which the sensor unit 100 is resting, providing a measurement which is associated with tilt of the sensor unit 100 in at least one direction. Providing a second displacement sensor 106 oriented to measure a second distance to the ground surface at a second location can provide the processing system 102 with sufficient measurement data to determine the spatial orientation of the sensor unit 100 relative to the ground surface. When sensor units 100 are disposed on opposite sides of an inspection lane 10, or when multiple sensor units 100 are disposed on the same side of an inspection lane 10, having displacement sensors 106 oriented to acquire a distance measurement of the spacing between individual sensor units 100 can provide the processing system with information useful for establishing the spatial relationship between the individual sensor units 100.

In a further embodiment of the present disclosure, one or more image sensors C capable of acquiring two-dimensional images of an observed field of view, are associated with the vehicle measurement system, and operative to provide supplemental information to the processing system 102. The information provided to the processing system 102 by the image sensors C may include, but is not limited to, ambient light (sunlight) measurements to assist in establishing laser power level settings for the displacement sensors 106, vehicle license plate detection and imaging for optical character recognition by the processing system 102 to identify a vehicle V, establishing a record of vehicle appearance and/or condition upon entry into the inspection lane 10, and detection of the presence (or absence) of a vehicle V entering or passing through the inspection lane 10. Video image data may be analyzed by the processing system 102 using suitable software instructions to obtain preliminary measurements associated with the speed of a vehicle V, the travel direction (i.e., steering direction) of a vehicle moving within the inspection lane 10, and vehicle wheel assembly tire and/or rim dimensions. Video image data may further be utilized, when synchronized with measurements from one or more displacement sensors 106, to confirm or clarify which surfaces on the vehicle V are being measured by the displacement sensors 106. Processing video image data to identify a visible laser spot projected by a displacement sensor 106 enable the processing system 102 to confirm that the laser spot is located on a tire sidewall surface 108 or wheel rim surface 110 at an intended measurement location at the time a measurement is acquired, and not on an adjacent vehicle body panel or between the spokes of a wheel rim.

Representations of vehicle wheel assembly runout may optionally be established from video image data by the processing system 102 by acquiring images of horizontal or vertical lines of illumination projected across the vehicle wheel assemblies 104, enabling the tire sidewall surface 108 curvature to be observed as the vehicle V moves through the inspection region IR of the inspection lane 10, and compared with the vehicle direction of travel. Runout of each wheel assembly 104 can be determined by identifying a cyclical variation in the observed tire sidewall surface motion for each vehicle wheel assembly 104. Once the runout is determined, the processing system 102 can be configured to offset or compensate measured vehicle wheel alignment angles determined from data acquired by the displacement sensors 106.

Figure 6:
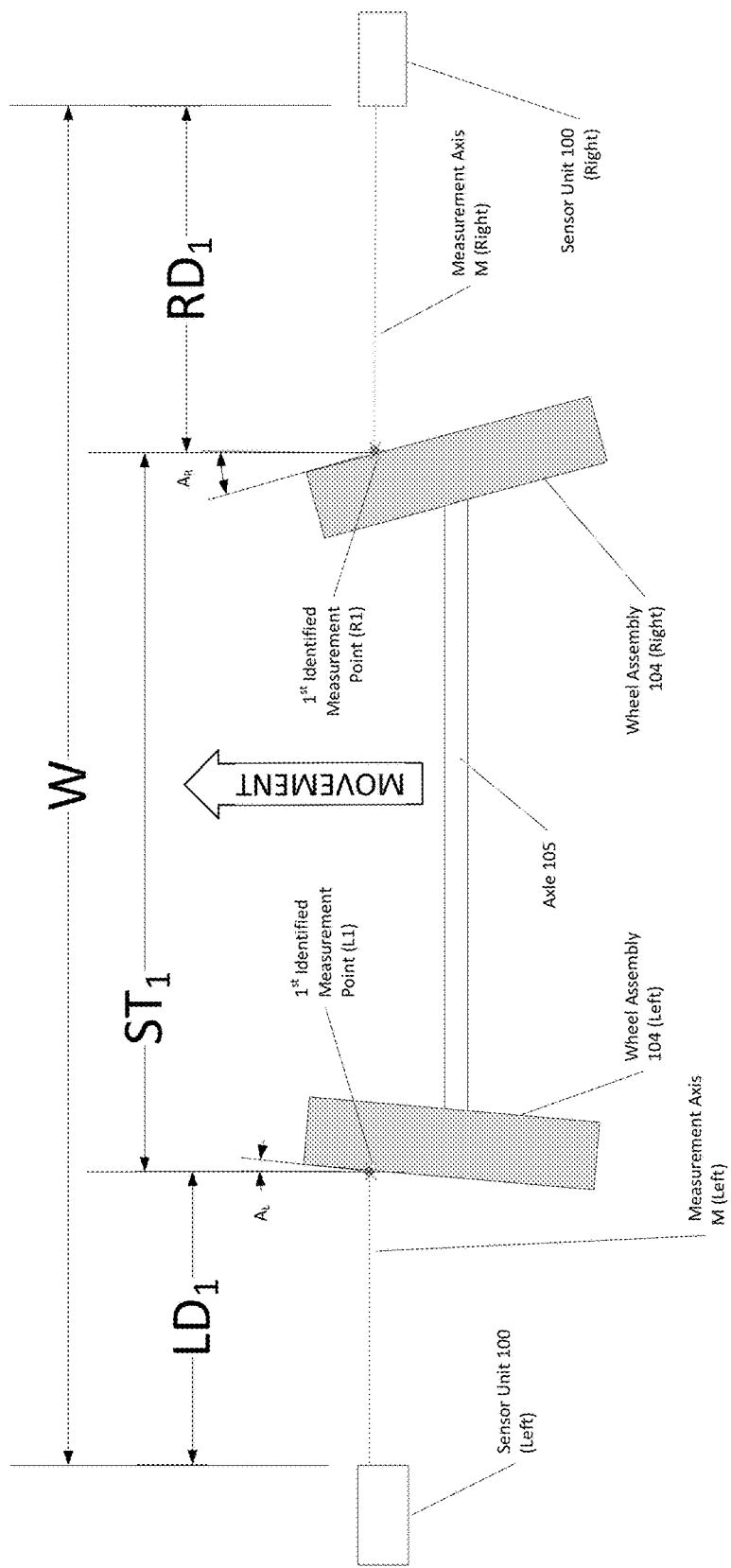
FIG. 6 is a top plan view of the relationships between a pair of opposed displacement sensors and the wheel assemblies on an axle of a moving vehicle associated with measurements of points on the leading tire sidewall surfaces.
Figure 7:
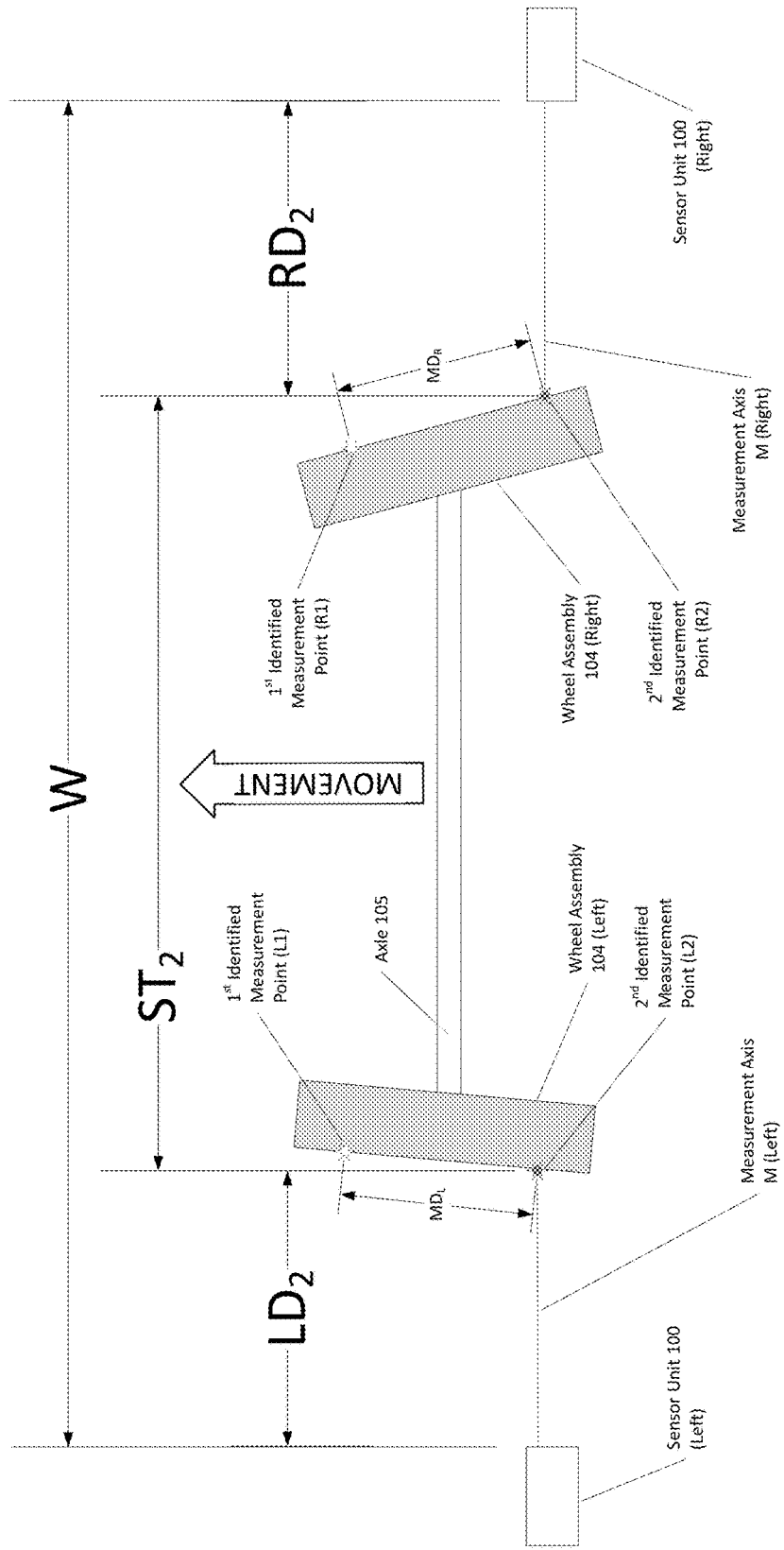
FIG. 7 is a top plan view of the relationships between the pair of opposed displacement sensors and the wheel assemblies on an axle of the moving vehicle shown in FIG. 6, associated with measurements on the trailing tire sidewall surfaces.

In a further exemplary embodiment of the present disclosure, illustrated in FIGS. 6 and 7, measurement data in a non-contact vehicle inspection system is acquired from the surfaces of moving vehicle wheel assemblies 104 on a common axle 105 which traverse through the sensor observation regions, such that the combination of translational movement and rotational movement of each wheel assembly 104 about a center point CP provides each observing displacement sensor 106 with a set of displacement measurement points defining a horizontal chord across the wheel assembly surfaces (tire and rim). Preferably, each horizontal chord of measurement points includes two data points on the tire sidewall surface 108 outer circumferential edge, and at least two data points on the wheel rim surface 110 circumferential edge. Multiple data points are acquired on the tire sidewall surfaces 108 and the wheel rim/spoke surfaces corresponding to identifiable features of the vehicle wheel assembly 104 such as the tire edge points, peak tire sidewall bulge points, and rim edge points, from which basic alignment information, such as the total toe angle for an axle 105 can be derived.

For a vehicle V which is moving in a straight line, with each wheel assembly 104 on an axle 105 aligned parallel to the direction of travel defined by the vehicle's thrust line, the distance between measurement points $L_1$, $R_1$ adjacent the leading edge of each wheel assembly 104 on the axle 105 will be equal to the distance between measurement points $L_2$, $R_2$ adjacent the associated trailing edges of the wheel assemblies 104, corresponding to a zero measure for total toe associated with the respective axle 105. For axles which have one or more vehicle wheel assemblies which are not aligned parallel to the straight-line direction of travel for the vehicle, the distance between the measurement points $L_1$, $R_1$ adjacent to the leading edges of the opposing wheel assemblies 104 will differ from the distance between the measurement points $L_2$, $R_2$ adjacent the trailer edges of the opposing wheel assemblies 104, indicating a non-zero value for a total toe measure associated with axle 105. Determined representations of the total toe of an axle 105 on a moving vehicle V are independent of the straight-line direction of the vehicle as it moves between the sensor units 100 on opposite sides of the inspection lane 10. In contrast, measurements which are representative of the toe alignment for individual wheel assemblies 104 of the vehicle V are highly sensitive to the straight-line direction of the vehicle when measured with displacement sensors 106. It will, of course, be recognized that excessive steering of a moving vehicle V during the acquisition of displacement measurements will introduce additional measurement variables which make the determination of wheel or axle characteristics difficult or impossible.

Turing to FIGS. 6 and 7, measurements acquired by an embodiment of the present disclosure for determining data representative of the total toe associated with an axle of a moving vehicle are shown. As the vehicle V moves through the inspection region IR between a pair of sensor units 100L, 100R each having one or more displacement sensors 106 disposed at a common vertical height and having a spacing distance or width W, a pair of measurements $LD_1$ and $RD_1$ are determined which are each representative of a distance from a displacement sensor 106 to an identified point L1, R1 on a wheel assembly 104 on the corresponding left or right lateral side of the passing vehicle axle 105. Those of ordinary skill in the art will recognize that a collection of measurements may be acquired sequentially from each displacement sensor 106, and subsequently analyzed, to identify the specific displacement measurements RD, LD corresponding to the identified point L1, R1 on a circumferential feature on each of the left or right wheel assembly surfaces, for example, a peak point on the leading tire sidewall surface bulge, a leading edge of the wheel rim, etc. By subtracting $LD_1$ and $RD_1$ from the spacing distance or width W, a total separation $ST_1$ for the first identified points L1, R1 on the wheel assemblies 104 is obtained.

$$ST_1 = W - LD_1 - RD_1 \qquad \text{(Eqn. 2)}$$

The process is repeated as shown in FIG. 7 to determine a pair of measurements $LD_2$ and $RD_2$ which are each representative of a distance from the displacement sensors 106 to a second identified point L2, R2 on the wheel assembly 104 on the corresponding left or right lateral side of the passing vehicle axle 105. Preferably, these second identified points L2, R2 are each spaced at respective known or determinable lateral distances $MD_L$ and $MD_R$ from the first identified points L1, R1 on each wheel assembly 104. Those of ordinary skill in the art will recognize that a collection of measurements may be acquired sequentially from each displacement sensor 106, and subsequently analyzed, to identify the specific displacement measurements RD, LD corresponding to the second identified point L2, R2 on a circumferential feature on each of the left or right wheel assembly surfaces, for example, a peak point on the trailing tire sidewall surface bulge, a trailing edge of the wheel rim, etc. By subtracting $LD_2$ and $RD_2$ from the spacing distance or width W, a total separation $ST_2$ for the second identified points L2, R2 on the wheel assemblies 104 is obtained.

$$ST_2 = W - LD_2 - RD_2 \qquad \text{(Eqn. 3)}$$

A change in the total separation for the wheel assemblies 104L and 104R on the observed axle 105 between the first and second identified points is representative of the total toe for the observed axle.

$$\text{Total Toe} \sim ST_1 - ST_2 = \Delta ST \qquad \text{(Eqn. 4)}$$

In an alternate procedure, the total toe value for an observed axle 105 is computed directly from the set of wheel assembly displacement measurements RD, LD associated with a moving vehicle axle 105 without reference to the specific sensor spacing distance or width W or the wheel assembly separation distances $ST_1$ and $ST_2$.

$$\text{Total Toe} \approx LD_2 + RD_2 - LD_1 - RD_1 \qquad \text{(Eqn. 5)}$$

The total toe value can alternatively be expressed in angular form by assuming that the lateral distances $MD_L$ and $MD_R$ between the acquired measurements on the face of each wheel assembly 104L, 104R are approximately equal for each wheel assembly on the observed axle 105.

$$\text{Total Toe} \cong 2 \cdot \arcsin\left(\frac{-\Delta ST}{MD_L + MD_R}\right) \qquad \text{(Eqn. 6)}$$

Slight differences between $MD_L$ and $MD_R$ resulting from sensor timing, sensor placement, or minor vehicle steering movement can be ignored for purposes of obtaining a Quick Check® type total toe measurement for an axle 105.

While the various embodiments of the present disclosure have been presented in the form of stationary sensor units containing one or more stationary displacement sensors or imaging sensors disposed to view a vehicle moving through a sensor region of an inspection lane, those of ordinary skill in the art will recognize that the element of movement between the sensor units and the vehicle may alternatively be achieved by maintaining the vehicle in a stationary position within a sensor region, and moving a set of displacement and/or imaging sensors laterally along a known path on each side of the vehicle to acquire the necessary measurement data, without departing from the scope of the present invention.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for assessing a condition of an axle of a moving vehicle, comprising:

for each outermost wheel assembly on an axle, contactlessly determining a distance from an associated fixed point not on the wheel, to a first identified location on the wheel assembly outer surface, along an associated fixed path while the vehicle is moving;

for each outermost wheel assembly on said axle, contactlessly determining a distance from said associated fixed point to a second identified location on the wheel assembly outer surface along said fixed path while the vehicle is moving; and establishing a representation of the total toe associated with said axle of the moving vehicle using each of the determined distances to the respective first and second locations on the outer surfaces of each outermost wheel assembly on said axle.

2. The method of claim 1 for assessing a condition of an axle of a moving vehicle wherein said step of establishing said representation of total toe includes:

evaluating each of the determined distances to the respective first locations on the outer surfaces of each outermost wheel assembly on said axle, together with a fixed separation distance between each of said associated fixed points, to calculate a separation distance between said respective first locations on each of said outermost wheel assemblies on said axle;

evaluating each of the determined distances to the respective second locations on the outer surfaces of each outermost wheel assembly on said axle, together with said fixed separation distance, to determine a separation distance between said respective second locations on each of said outermost wheel assemblies on said axle; and comparing the determined separation distance between the respective first locations and the determined separation distance between the respective second locations to determine a separation distance difference, said separation distance difference establishing said representation of the total toe associated with said axle of the moving vehicle.

3. The method of claim 1 for assessing a condition of an axle of a moving vehicle wherein said step of establishing said representation of total toe includes subtracting each of the determined distances to the respective first locations on each of said outermost wheel assemblies on said axle from a sum of the determined distances to the respective second locations on each of said outermost wheel assemblies on said axle.

4. A method for assessing a condition of an axle of a moving vehicle, comprising:
for each outermost wheel assembly on opposite ends of an axle, contactlessly determining a distance, from an associated fixed point not on the wheel assembly, along an associated fixed path, to a first identified location on the wheel assembly outer surface while the vehicle is moving, and subsequently, a distance along said associated fixed path to a second identified location on the wheel assembly outer surface while the vehicle is moving;
combining said four determined distances together to provide a representation of the total toe associated with the axle of the moving vehicle.

5. The method of claim 4 wherein said vehicle is moving non-orthogonally relative to at least one of said associated fixed paths.

6. The method of claim 4 wherein said fixed path associated with an outermost wheel assembly at one end of said axle is parallel to said fixed path associated with an outermost wheel assembly at an opposite end of said axle.

7. A method for evaluating a condition of an axle of a moving vehicle, said axle having left and right outermost wheel assemblies, comprising:
moving said vehicle so as to impart a rolling movement to said left and right outermost wheel assemblies on said axle;
acquiring, for the left outermost wheel assembly, a first associated displacement measurement from a first fixed point to a first point on a surface of the left outermost wheel assembly along a first measurement axis, and, at a subsequent point in time during said movement of the vehicle, a second associated displacement measurement from the first fixed point to a second point on the surface along said first measurement axis;
acquiring, for the right outermost wheel assembly, a first associated displacement measurement from a second fixed point to a first point on a surface of the right outermost wheel assembly along a second measurement axis, and, at a subsequent point in time during said movement of the vehicle, a second associated displacement measurement from the second fixed point to a second point on the surface along said second measurement axis;
wherein a direction of said movement of the vehicle is independent of said first and second measurement axes; and
collectively combining each of said first and second displacement measurements associated with said left and right wheel assemblies to establish a representation of axle total toe.

8. The method of claim 7 further wherein collectively combining each of said first and second displacement measurements associated with said left and right wheel assemblies includes adding together said second displacement measurements associated with said left and right wheel assemblies to produce a sum, and subtracting from said sum, each of said first displacement measurements associated with said left and right wheel assemblies to establish said representation of said axle total toe.

9. The method of claim 8 further including transforming said representation of said axle total toe into an angular representation.

10. The method of claim 7 wherein a direction of said movement of the vehicle is non-orthogonal to each of said first and second measurement axes.

11. The method of claim 7 wherein said representation of said axle total toe is established only from each of said first and second displacement measurements associated with said left and right wheel assemblies on said axle.

* * * * *